Oct. 12, 1965 E. E. MERFELD 3,212,061

INFORMATION HANDLING APPARATUS

Filed Dec. 21, 1960

INVENTOR.
EUGENE E. MERFELD

BY Henry L. Hanson

ATTORNEY

United States Patent Office 3,212,061
Patented Oct. 12, 1965

3,212,061
INFORMATION HANDLING APPARATUS
Eugene E. Merfeld, Lexington, Mass., assignor to Honeywell Inc., a corporation of Delaware
Filed Dec. 21, 1960, Ser. No. 77,414
6 Claims. (Cl. 340—172.5)

Figure 1:
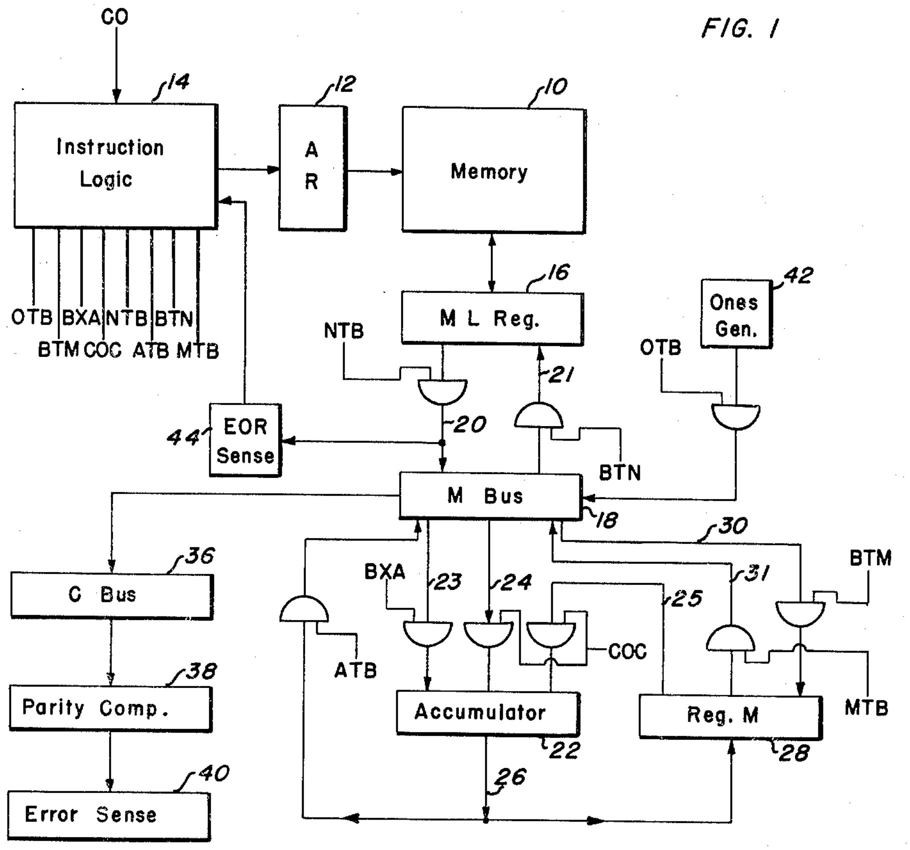

A general object of the present invention is to provide a new and improved data manipulation circuit having associated therewith checking circuitry to ensure that the operation thereof is performed without error. More specifically, the present invention is particularly useful in verifying the accuracy of the generation of satellite data which is used in automatic error detection and correction systems.

In the processing of digital data in electronic data processing systems, the data is frequently handled in the form of words made up of a predetermined number of binary digits or bits. Several of these words may be manipulated together and represent a common batching of information which is sometimes conveniently referred to as a record. Such a record may well represent the data related to an inventory item, an insurance policy or the like.

When a particular record of information is being used in a data processing system, the record is generally assembled by way of a prearranged program and then may well be manipulated as an entire record in all subsequent operations relating thereto. The manipulations may involve, for example, the movement or reading of the information out of a central processor onto a magnetic tape where the data may be stored for future reference. When the data is subsequently required, it will be read from the tape back into the central processor where related data manipulations will be performed. In the process of manipulating and transferring digital data, there is always the possibility that a transient condition or circuit failure may occur which will cause a loss of information. In order to ensure that a data processing operation does not occur when some of the digital data has been modified in an unplanned manner due to a circuit failure or a transient condition, it is necessary to provide a means for determining when an error condition exists. One of the ways in which it is possible to detect an error condition is to carry with the data being manipulated certain satellite information which, when compared with the information being manipulated, can be used to indicate when an error has occurred. This satellite information, in its elemental form, may take the form of a modulo 2 summing of all of the bits of each of the words of the record. In its more complex form, the satellite information may be generated in such a manner that the contents thereof may be used for detecting the presence of errors and also correcting errors that may have occurred without resorting back to original source information. Such a system is shown and described in a copending application of R. M. Bloch, Serial Number 702,668, filed December 13, 1957, now issued as Patent Number 2,977,047.

In a data processing system wherein means are provided for generating satellite information useful for error detecting and correcting operations, it is desirable that the generation of the satellite information be appropriately checked to ensure that once this satellite information is appended to the record with which is is associated, there is a certainty that this operation has been performed without error.

It is, therefore, a further object of the present invention to provide a new and improved apparatus for checking that portion of a data processing system used in the generation of satellite data which may be associated with the data being manipulated thereby.

Another more specific object of the present invention is to provide a new and improved satellite generating circuit for digital data being processed wherein the satellite generation function is checked to determine whether or not the operation has been performed without error.

The foregoing objects and features of novelty which characterize the invention, as well as other objects of the invention, are pointed out with particularity in the claims annexed to and forming a part of the present specification. For a better unnderstanding of the invention, its advantages and specific objects attained with its use, reference should be had to the accompanying drawings and descriptive matter in which there is illustrated and described a preferred embodiment of the invention.

Figure 2:
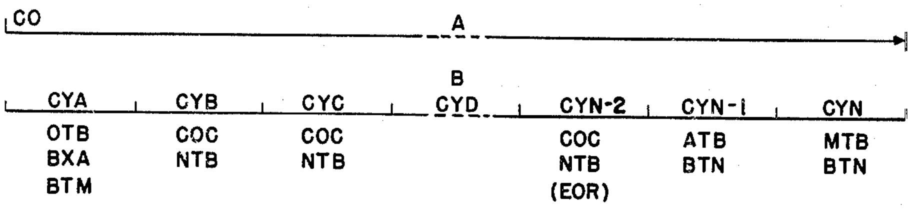

Of the drawings:

FIGURE 1 is a diagrammatic representation of the related portions of a data processing system which may be used for purposes of generating satellite information and a checking circuit for such generating operation; and FIGURE 2 is a graphical representation of the timing associated with the satellite generation function.

Referring first to FIGURE 1, the numeral 10 represents a data processing system memory which is adapted to store digital data. The memory 10 may take the form of a coincident current type memory, a drum, or the like wherein the memory is capable of storing a plurality of data processing words, each of which is uniquely addressable by way of an input address selection system. The selection address used for a particular word location may be conveniently stored in an address register AR, as indicated at 12 in FIGURE 1. The particular address that is supplied to the address register 12 may be supplied by way of a program order which is appropriately interpreted by logic included within the system. Such interpretation logic may be included in the portion of the system indicated generally at 14. In addition to providing the address data for the address register 12, the instruction logic may also provide certain sub-command logical signals which may be utilized in performing the selected data processing operation.

Also associated with the present data processing operation is the memory local register 16 which is adapted to receive words selectively read out of the memory 10 or to be read into the memory 10. The memory local register 16 is arranged to communicate with a main bus 18 by way of an input line 20 and an output line 21.

The main bus 18, in turn, communicates and receives communications from a number of other circuits. One of these other circuits is an accumulator 22 which is adapted to have inputs by way of the input lines 23, 24 and 25. An output line 26 from the accumulator 22 is arranged to communicate back to the main bus 18 or to a register 28. The register 28, sometimes referred to as the M register, is also arranged to receive input information from the main bus 18 by way of an input line 30. Data may be passed from the register M to the main bus 18 by the line 31 or to the accumulator 22 by way of the line 25.

The main bus 18 also communicates with a checking bus 36, the latter of which communicates with a parity computer 38. The output of the parity computer is arranged for connection to an error sensing circuit 40.

An appropriate ones generator 42 is arranged for connection to the main bus line 18. In addition, an end-of-record sensing circuit 44 is adapted to sense the contents of the data passing into the main bus 18 by way of the line 20.

The specific manner in which the individual circuits are implemented will depend, in part, upon whether parallel or serial information flow is desired. Representative logic and circuits which may be used in accordance with the principles hereof are illustrated and described in the copending application of Henry W. Schrimpf, Serial Number 636,256, filed January 27, 1957.

Thus, the memory 10 and its associated register circuitry may take the form that is to be found in the Schrimpf application in the subject matter related to FIGURES 14 through 17. The transfer busses 18 and 36 herein may be of the type referred to in FIGURE 19 of the Schrimpf application. The half-adding accumulator 22 herein may take the form shown in the above-mentioned Bloch application. The instruction logic circuitry 14 may well be of the type shown in FIGURES 37 and 41 in said Schrimpf application. The end-of-record sense circuit 44 herein may correspond to the sentinel sensing circuit shown in said application at FIGURES 33A and B. The parity computer 38 and check circuitry 40 may be as illustrated and described in the patent of R. M. Bloch, bearing Number 2,634,052.

In considering the operation of the apparatus illustrated in FIGURE 1, it is first assumed that each word making up the record being manipulated is of a fixed length, even though the number of words in a particular record may not necessarily be the same as that of any other record. It has been found that a very effective way of generating satellite data for a particular record is to half-add the correspondingly related bits of each of the words making up the record. The accumulation that results from this half-add operation may then be appropriately appended to the record with which it is associated within a memory of the apparatus so that the complete record and its satellite may ultimately be transferred to bulk storage for future reference.

In the form of the invention illustrated in FIGURE 1, the satellite data which is generated for the record being manipulated will take the form of two separate words which may be respectively related to the odd and even words appearing in the record. This form of double satellite improves the power of the check, as well as the ability of the circuit to correct in the event that an error occurs.

The data manipulations performed between the respective circuits shown in FIGURE 1 may occur in any desired manner such as serial transfer, parallel transfer or combinations thereof. The operations performed, whether serial or parallel, will be performed in predetermined length periods of time which may be conveniently referred to as cycles. Thus, referring to FIGURE 2, a control order CO which extends for a time length indicated at A may have that time length divided into a number of cycles indicated at B by the cycle segments CYA through CYN.

When the control order CO, read into the instruction logic of 14, is an order calling for the generation of the satellite data for a record, this control order will specify the locations and memory where the words associated with a particular record are located. In addition, the control order CO will specify the sub-commands to be performed in conjunction with the carrying out of the over-all order. Thus, referring to FIGURE 2, during cycle A, three control functions are to be performed. These functions are related to the loading of a word of all "ones" into the accumulator 22 and the register 28. Thus, the output of the ones generator 42 is approximately gated by a "ones-to-bus" function OTB so that a series of "ones" will pass into the main bus 18. The output lines 23 and 30 are appropriately gated by the sub-command functions BXA and BTM so that the "ones" fed into the bus 18 may be inserted into the accumulator 22 and the register 28.

Upon the occurrence of cycle B, the sub-command functions COC and NTB will be produced. Thus, the first word from the memory 10 will pass into the memory local register 16 and thence through the line 20 as gated by the function NTB into the main bus 18. The operand in register 28 which is a word of all "ones" will be adapted to appear on the output line 25 so that it may be appropriately combined with the outut of the main bus on the line 24, as these two functions are gated toegther by the sub-command function COC. At the time that the input operands on the line 24 and 25 are coming in, the output of the accumulator 22 is fed by way of the line 26 to the register 28. Inasmuch as the accumulator 22 is functioning in a half-add mode, each of the input operands will be added modulo 2 in their respective bit positions, and the result will reside in the accumulator 22. Thus, the "all-ones" operand from register M will have been half-added to the first word coming in from the memory 10. Further, the register M will now contain the operand previously stored in the accumulator 22 which is a word formed of a series of "ones."

During cycle C, the second input operand from the memory 10 will come in through the memory local register 16 and the main bus 18 to the input line 24 of the accumulator 22. At the same time, the operand in the register M will be fed by way of the line 32 to the input of the accumulator 22 so that the two operands may be added on a bit-by-bit basis in the manner described above. At the same time that the half-adding operation is going on within the accumulator, the previous contents of the accumulator are read out on the output line 26 and inserted into the register 28. Thus, at the end of cycle C, a satellite word for the odd input words resides in register 28, while a satellite for the even input words lies in accumulator 22. The input operands will continue to come in so long as there are appropriate addresses being called up by way of the instruction logic 14 until such time as one of the operands read from the memory takes the form of an end-of-record operand which may contain a preselected bit combination peculiarly identifying the end of a particular record. As soon as the end-of-record word has been sensed by the sensing circuit 44, as the word is being applied to the main bus 18, the signal will be fed to the instruction logic 14 to condition the logic for completing the generation of the satellite data. The end-of-record word will pass into the main bus and thence into the accumulator to be added with the word transferred in from the register 28 so that the end-of-record word will also be included within the satellite data representing the record.

In the cycle immediately following the cycle in which the end-of-record word is half-added in the accumulator 22, the contents of the accumulator 22 will be transferred out of the accumulator to the main bus by the line gated by the sub-command function ATB. The word will then be transferred by way of the bus 18 to the memory local register 16 and thence to the appropriate memory location within the memory 10. In the next succeeding cycle, cycle CYN, sub-command function MTB will be active so that the output line 31 will be gated to pass the satellite word stored therein to the main bus 18 and thence to the memory local register 16 and the memory 10.

In the event that the foregoing satellite generation function should be accompanied by an appropriate error due to a transient or a malfunction within one of the circuits used in the generating operation, it is essential that provision be made to ensure that this error does not go undetected. For this purpose, the input words fed by way of the main bus 18 into the accumulator are each read into the checking bus 36, and thence to a parity computer 38. This parity computer, in its elemental form, may take the form of a means for adding modulo 2 all of the corresponding bits of each of the input operands. In a preferred embodiment of the invention, wherein each input operand took the form of forty-eight bits, six individual stages were provided within the parity computer 38 so that the parity was determined on the basis of selected eight-bit combinations of each operand. The transfer of subsequent input operands by way of the main bus 18 are also adapted to be appropriately examined in the parity computer 38, and the results added modulo 2 with the results previously stored therein. This parity computation and accumulation will continue until all of the input operands have been appropriately transferred to the accumulator 22 in connection with the satellite generation operation. After the satellite generation is completed, and the satellites are being transferred back to memory by way of the main bus 18, these satellites will also be appropriately transferred to the checking bus 36 and thence to the parity computer and accumulator 38. If this satellite generation process has been carried out without error, the results stored in the parity computer 38 at the completion of the operation will be zero. In the event that a multiple stage parity circuit is used in connection with the operands, all stages thereof should be set at zero at the completion of the operation.

The operation of the aforedescribed apparatus may be verified mathematically by way of a simplified example. Thus, there is illustrated below in Table I a simplified example wherein three words are used to generate a satellite where each word and the satellite are considered to be eight bits in length. Further, in the example, the parity check associated with these words is assumed to be on a four-bit character basis so that the parity computer will comprise two stages, stage 1 and stage 2, associated with the respective characters 1 and 2.

*Table I*

| | Char. 1 | Parity C. Stage #1 | Char. 2 | Parity Comp. Stage #2 |
|---|---|---|---|---|
| Word 1 | 0110 | 0 | 0001 | 1 |
| "Ones" operand | 1111 | | 1111 | |
| Mod 2 sum | 1001 | | 1110 | |
| Word 2 | 0010 | 1 | 0110 | 0 |
| Mod 2 sum | 1011 | 1 | 1000 | 1 |
| Word 3 | 0110 | 0 | 1110 | 1 |
| Mod 2 sum | 1101 | 1 | 0110 | 0 |
| S. Output | 1101 | 1 | 0110 | 0 |
| Mod 2 sum | | 0 | | 0 |

As word 1 is examined in the parity computer, the stage 1 portion of the parity computer examines character 1 and will remain set at a "zero" state indicating that there are an even number of "ones" in character 1. The parity computer stage 2 which is producing the parity for character 2 will be set to a "one" inasmuch as there are an odd number of "ones" in character 2.

The "ones" operand is then added to the individual characters 1 and 2 of word 1 on a half-add or modulo 2 basis.

Word 2 will then be fed into the accumulating circuit and, as it is being fed in, it will be examined by way of the parity computer. In this instance, the parity computer stage #1 will sense that there are an odd number of "ones" in character 1 of word 2 and the parity computer stage #2 will sense that there are an even number of "ones" in character 2 of word 2. Word 2 is then half-added or added modulo 2 with the previous modulo 2 sum. At the same time, the respective parity computer stages are accumulating the parity bits mod 2 so that upon completion of this second modulo 2 summing, the parity computer stages 1 and 2 will now be set to the "one" state to correspond to the summing of the two parity bits computed.

Word 3 is then fed into the combination and the parity bits associated with each of the characters thereof are appropriately computed in the stages 1 and 2 and the results of this parity computation is added modulo 2 with the previous accumulated parity at the same time that the characters are being added modulo 2. The result of adding the three words, assumed to be the entire record, will be the satellite output which will be fed back for storage in the memory as described above and in the course of feeding back, the parity on each of the characters thereof will be again computed in the parity computer stages 1 and 2. The results of this further parity computation are again added modulo 2 and, when so added, will be seen to set both parity stages to "zero." This thereby indicates that the satellite generation has been performed without error.

It will be readily apparent that the foregoing explanation set forth in Table I may be extended to apply to the specific circuitry illustrated in FIGURE 1 wherein two satellite words, as represented by the two characters, are being generated. Further, the principles are applicable regardless of whether the information is being manipulated on a serial or on a parallel basis.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. In combination, data transfer means, a digital accumulator, said accumulator being adapted to half-add a pair of input operands applied thereto, means connecting said data transfer means to the input of said accumulator, so that a series of input operands may be half-added and accumulated in said accumulator, a parity computer connected to said transfer means and adapted to produce a parity count of the data bits of each operand transferred by said transfer means, said parity computer further adapted to half-add and accumulate the parity bits of all of the input operands transferred by said transfer means, means connected to transfer the accumulated results of said accumulator to said transfer means and to said parity computer wherein a parity count of the respective bits of said accumulated results is generated and half-added to the previously generated and stored Mod 2 sum of said parity bits, said parity computer having an accumulation therein upon the completion of said last-named operation in the form of a preselected signal output indicative of whether or not the accumulated result of said half-added input operands has been generated without error.

2. In the generation of satellite information to be associated with a group of data words including means for establishing the validity of said satellite information comprising the combination of, data transfer means, a digital accumulator, said accumulator being adapted to half-add the input operands applied thereto, means connected to said accumulator to feed in an initial input operand in the form of a series of "ones," means connecting said data transfer means to the input of said accumulator, so that a series of input operands may be half-added to the initial all "ones" operand and accumulated in said accumulator, a parity computer connected to said transfer means and adapted to produce a parity count of the data bits of each input operand transferred by said transfer means, said parity computer further adapted to half-add and accumulate the parity bits of all of the input operands transferred by said transfer means, means connected to transfer the accumulated results of said accumulator to said transfer means and to said parity computer wherein a parity count of the respective bits of said accumulated results is generated and half-added to the previously generated and stored Mod 2 sum of said parity bits, said parity computer having an accumulation therein upon the completion of said last-named transfer in the form of a preselected signal output indicative of whether or not said accumulator has operated without error.

3. In combination, data transfer means, a digital accumulator, said accumulator being adapted to half-add the input operands applied thereto, a first operand source connected to said accumulator to supply to said accumulator an initial operand formed of all "ones," means connecting said data transfer means to the input of said accumulator for supplying thereto all input operands subsequent to said first input operand, so that a series of input operands including said initial operand may be half-added and accumulated in said accumulator, a parity computer connected to said transfer means and adapted to produce a parity count of the data bits of each input operand, said parity computer further adapted to half-add and accumulate the parity bits of all of the input operands, an end-of-record sensing means connected to said data transfer means to sense each input operand, means connected to be activated by said end of record sensing means upon detection thereof to transfer the accumulated results of said accumulator to said transfer means and to said parity computer, said parity computer having an accumulation therein upon the completion of said last-named operation in the form of a preselected signal output indicative of whether or not the accumulated result of said half-added input operands has been generated without error.

4. In combination, an accumulator adapted to half-add a pair of digital input operands, a storage register, means connecting the output of said accumulator to said storage register, means connecting the output of said storage register to said accumulator, an input operand transfer circuit connected to the input of said accumulator and adapted to transfer an operand to said accumulator so that said operand may be half-added to an operand from the output of said storage register, a parity computer connected to said input operand transfer circuit, said parity computer accumulating a parity count of each input operand from said transfer circuit, and means connecting the output of said accumulator to said transfer circuit and to said parity computer, said last-named means becoming operative upon the completion of the transfer of input operands to said accumulator whereby the accumulated results of all said half-added input operands may be transferred to said parity computer and a parity count generated from the bits thereof so that the Mod 2 sum formed by the parity count generated therefrom when half-added to the accumulated parity count of all the input operands is effective in generating a preselective signal output indicating whether or not the accumulated result of said half-added input operands has been generated without error.

5. In the generation of satellite information to be associated with a group of data words including means for establishing the validity of said satellite information comprising the combination of, an accumulator adapted to half-add a pair of digital input operands, a storage register, means connected to both said accumulator and said storage register to load therein a pair of operands formed of a series of "ones", means connecting the output of said accumulator to said storage register, means connecting the output of said storage register to said accumulator, an input operand transfer circuit connected to the input of said accumulator and adapted to transfer an operand to said accumulator so that said operand may be half-added to an operand from the output of said storage register, means transferring the operand stored in said accumulator to said register prior to the completion of each half-add operation, a parity computer connected to said transfer circuit, said parity computer accumulating a parity count of each input operand from said transfer circuit, and means connecting the output of said accumulator to said transfer circuit and to said parity computer, said last-named means becoming operative upon the completion of transfer of input operands to said accumulator whereby a parity count of the respective bits of said accumulated results is generated and half-added to the previously accumulated parity count of each operand and to thereby indicate whether or not the accumulated result has been generated without error.

6. In combination, an accumulator adapted to half-add a pair of digital input operands, a storage register, a "ones" operand generator connected to load an all "ones" operand in both said accumulator and said register, means connecting the output of said accumulator to said storage register, said last-named means transferring the operand stored in said accumulator to said storage register prior to the completion of each half-add operation in said accumulator, means connecting the output of said storage register to said accumulator, said last-named means transferring the operand stored in said register to be half-added with a further input operand, an input operand transfer circuit connected to the input of said accumulator and adapted to successively transfer a further one of said input operands to said accumulator so that said further one of said input operands may be half-added to the output of said storage register, a parity computer connected to said transfer means, said parity computer accumulating a parity count of each of said further input operands from said transfer circuit, an end-of-record sensing means connected to said transfer circuit to sense the data bits in each input operand, and means activated by said end of record sensing means for connecting the output of said accumulator and said storage register to said transfer circuit and to said parity computer upon the completion of transfer of input operands to said accumulator whereby a parity count of the respective bits of said accumulated and stored results are generated and half-added to the previously accumulated parity count of each input operand to thereby indicate whether or not the accumulated and stored result has been generated without error.

References Cited by the Examiner

UNITED STATES PATENTS

| | | | |
|---|---|---|---|
| 2,977,047 | 3/61 | Bloch | 340—147 |
| 3,037,697 | 6/62 | Kahn | 235—153 |

OTHER REFERENCES

Richards, R. K.: Arithmetic Operations in Digital Computers; New York, D. Van Nostrand Co., Inc. 1955 pp. 187–188 relied on.

MALCOLM A. MORRISON, *Primary Examiner.*

IRVING L. SRAGOW, *Examiner.*